UNITED STATES PATENT OFFICE 2,398,767

METHOD OF PRODUCING CELLULOSE ETHERS

William J. Burke, Marshallton, Del., assignor to E. I. du Pont de Nemours & Company, Wilmington, Del., a corporation of Delaware No Drawing. Application August 31, 1944, Serial No. 552,199

6 Claims. (Cl. 260—231)

This invention relates to cellulose ethers and more particularly to a method of preparing organic solvent-soluble highly substituted methallyl ethers of cellulose.

It is an object of this invention to prepare organic solvent-soluble, highly substituted methallyl ethers of cellulose from low cost, readily available raw materials by a simple, inexpensive process requiring only standard equipment commonly used in the manufacture of commercially available cellulose ethers.

Another object is to provide highly substituted methallyl ethers of cellulose useful as film, filaments, and in coating compositions.

The above and other objects will more clearly appear hereinafter.

These objects are realized by my invention which, briefly stated, comprises reacting alkali cellulose with at least about 20 mols of a methallylating agent per mol of cellulose in an inert solvent in the presence of excess caustic alkali and at a temperature of 80°–130° C. The resulting organic solvent-soluble methallyl cellulose ethers contain more than two methallyl groups per glucose unit and are excellent film- and filament-formers.

The nomenclature "methallyl" used herein refers to the group

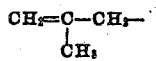

according to the current usage of the term.

In carrying out the process of this invention there can be used any purified cellulosic material such as cotton linters or wood pulp of the type used in the preparation of viscose rayon.

Although methallyl chloride is preferred because of its low cost and the ease with which it reacts with cellulose to give the desired organic solvent-soluble products, any methallylating agent such as methallyl bromide, methallyl iodide, methallyl sulfate, etc., can also be used with satisfactory results. At least 20 mols, and preferably from 20–30 mols, of methallyl halide are used per mol of cellulose in order to obtain organic solvent-soluble products having more than 2.0 methallyl groups per glucose unit. It is to be emphasized that the use of at least about 20 mols of methallylating agent per mol of cellulose is critical to this invention; organic solvent-soluble cellulose methallyl ethers containing more than two methallyl groups per glucose unit are not obtained if this limit is not observed. By using about 30 or more mols of methallyl chloride per mol of cellulose, organic solvent-soluble products containing 2.5 to 2.8 methallyl groups per glucose unit can be obtained.

Any caustic alkali can be used in this invention. Sodium hydroxide is preferred because of its low cost, low equivalent weight and ready reactivity. In general, a 1–5 molar excess of alkali over methallyl halide is used in order to avoid excessive degradation and to facilitate emulsification of the reaction mixture.

The reaction proceeds at a temperature in the range of 70°–150° C. A temperature of 90°–120° C. is preferred, since in this range the reaction occurs readily to give products having the most desirable physical properties. The reaction is conveniently carried out in autoclaves of the type used for the preparation of commercial ethyl cellulose. However, if desired, the reaction can take place at atmospheric pressure by the use of inert solvents such as dioxane, toluene, xylene or 1,2-diethoxyethane. Anti-oxidants such as cresol and hydroquinone can be used with advantage when the emulsion is added to hot water used in isolating the product. Use of a solvent which is miscible with water, such as dioxane, permits isolation of the product by pouring the reaction mixture into water at room temperature. This minimizes the possibility of insolubilization during isolation.

In the preferred practice of this invention a mixture of shredded alkali cellulose, benzene, methallyl chloride, and pulverized sodium hydroxide is stirred and heated under nitrogen in an autoclave at a temperature of 90°–120° C. for six to twelve hours. The product is isolated by any of the methods commonly used with organic solvent-soluble cellulose ethers.

The detailed practice of this invention is illustrated by the following example in which parts are given by weight.

Example

Alkali cellulose is prepared by steeping 800 parts of cotton linters pulp in 18% sodium hydroxide containing 1% sodium formate for one hour at room temperature, pressing to a weight of 2400 parts, and shredding for two hours at 25° C. To 875 parts of this alkali cellulose in a nickel-lined autoclave is added 2000 parts benzene, 4080 parts methallyl chloride (25 mols/mol cellulose) and 1870 parts powdered sodium hydroxide (total NaOH 29.4 mols/mol cellulose). The air in the autoclave is replaced with nitrogen and the reaction mixture heated under autogenous pressure at 115° C. for twelve hours. The autoclave is cooled to room temperature, and 2000 parts of water is added with stirring. The resulting emulsion is removed from the autoclave and added slowly to vigorously agitated water at 90° C. in order to precipitate the product and remove volatile by-products. The product is removed by filtration and washed successively with water, 0.5% acetic acid, 0.5% formic acid containing 0.1% sulfuric acid, water, 0.5% ammonium hydroxide, and water. After drying under vacuum at room temperature, the product analyzes for 62.7% carbon and 8.5% hydrogen, which corresponds to 2.1 methallyl groups per glucose unit.

The product is readily soluble in aromatic and chlorinated hydrocarbons, ethyl acetate and alcohol-aromatic hydrocarbon mixtures. Film cast from a 15% benzene-methanol (90–10) solution is clear, bright and pliable. The film becomes insoluble after heating in air at 100° C. for one hour or upon aging in air for several days at room temperature. Addition of small quantities of anti-oxidants such as hydroquinone or cresol to the precipitating bath, or to the reaction mixture emulsion, results in products which remain soluble at room temperature over long periods of time.

When the autoclave reaction is carried out as described above with the exception that the molar ratio of cellulose to methallyl chloride to sodium hydroxide is 1:10:12.5, there is obtained a fibrous product which is insoluble in common solvents for cellulose ethers. The product analyzes for 53.6% C and 7.3% H, and has an iodine number of 113. These data indicate introduction of about one methallyl group per glucose unit.

By using 10 mols of the isomeric crotyl chloride in place of 10 mols of methallyl chloride in the above experiment, an organic solvent-soluble crotyl cellulose containing 2.1 crotyl groups per glucose unit is obtained, which shows that prior art methods for making crotyl cellulose are not applicable to the chemically very closely related methallyl cellulose.

In comparison with certain previously described organic solvent-soluble cellulose ethers containing methallyl groups, the ethers of this invention are much more highly methallylated in that they contain over 2.0 methallyl groups per glucose unit. This high degree of substitution leads to substantially lower water absorption, increased dimensional stability, wider range of solubility in hydrocarbon solvents, and greater ease of insolubilization. Further, when methallyl cellulose containing more than two methallyl ether groups per glucose unit is formed into shaped objects and heated, the resulting products are much more resistant to swelling by solvents or attack by corrosive chemicals than similar objects prepared from cellulose ethers of lower methallyl content. Methallyl cellulose ethers of this invention are much more readily insolubilized than crotyl cellulose of a comparable degree of substitution and hence are much more satisfactory in uses where it is desirable to obtain insolubilization in a short time at a low temperature.

The products of this invention are useful in the preparation of fibers, films, plastics, and coating compositions. The high degree of methallyl substitution makes them particularly attractive since shaped objects can be readily and completely insolubilized.

It is to be understood, of course, that my invention is not limited to the embodiments hereinabove described but comprehends rather all modifications and variations falling within the spirit and scope of the invention as defined in the appended claims.

I claim:

1. The method of producing highly substituted organic solvent-soluble methallyl ethers of cellulose which comprises reacting alkali cellulose with at least about 20 mols of methallylating agent per mol of cellulose in the presence of a molar excess of caustic alkali over the methallylating agent whereby to produce a methallyl ether of cellulose containing more than two methallyl groups per glucose unit.

2. The method of producing highly substituted organic solvent-soluble methallyl ethers of cellulose which comprises reacting alkali cellulose with at least about 20 mols of methallylating agent per mol of cellulose in the presence of a molar excess of caustic alkali over the methallylating agent and at a temperature of from 80° to 130° C. whereby to produce a methallyl ether of cellulose containing more than two methallyl groups per glucose unit.

3. The method of producing highly substituted organic solvent-soluble methallyl ethers of cellulose which comprises reacting alkali cellulose with at least about 20 mols of methallyl halide per mol of cellulose in the presence of a molar excess of caustic alkali over the methallyl halide and at a temperature of from 80° to 130° C. whereby to produce a methallyl ether of cellulose containing more than two methallyl groups per glucose unit.

4. The method of producing highly substituted organic solvent-soluble methallyl ethers of cellulose which comprises reacting alkali cellulose with at least about 20 mols of methallyl chloride per mol of cellulose in the presence of a molar excess of caustic alkali over the methallyl chloride and at a temperature of from 80° to 130° C. whereby to produce a methallyl ether of cellulose containing more than two methallyl groups per glucose unit.

5. The method of producing highly substituted organic solvent-soluble methallyl ethers of cellulose which comprises reacting alkali cellulose with at least about 20 mols of methallyl chloride per mol of cellulose in the presence of a 1 to 5 molar excess of sodium hydroxide over methallyl chloride and at a temperature of from 90° to 120° C. whereby to produce a methallyl ether of cellulose containing more than two methallyl groups per glucose unit.

6. The method of producing highly substituted organic solvent-soluble methallyl ethers of cellulose which comprises heating in a closed vessel 875 parts by weight of alkali cellulose with 4080 parts of methallyl chloride in the presence of 1870 parts of sodium hydroxide at a temperature of 115° C. for twelve hours whereby to form a methallyl ether of cellulose containing 2.1 methallyl groups per glucose unit.

WILLIAM J. BURKE.